United States Patent [19]

Knaebel

[11] Patent Number: 4,744,803
[45] Date of Patent: May 17, 1988

[54] COMPLEMENTARY PRESSURE SWING ADSORPTION

[75] Inventor: Kent S. Knaebel, Dublin, Ohio

[73] Assignee: The Ohio State University Research Foundation, Columbus, Ohio

[21] Appl. No.: 767,138

[22] Filed: Aug. 19, 1985

[51] Int. Cl.[4] ............................................. B01D 53/04
[52] U.S. Cl. ......................................... 55/25; 55/58; 55/62; 55/68; 55/75; 55/179; 55/389
[58] Field of Search .................. 55/25, 26, 58, 62, 68, 55/75, 179, 180, 389

[56] References Cited

U.S. PATENT DOCUMENTS

| | | | |
|---|---|---|---|
| 3,086,339 | 4/1963 | Skarstrom et al. | 55/26 |
| 3,237,377 | 3/1966 | Skarstrom | 55/25 |
| 3,252,268 | 5/1966 | Stark | 55/25 |
| 3,922,149 | 11/1975 | Ruder et al. | 55/25 X |
| 3,923,477 | 12/1975 | Armond et al. | 55/25 |
| 4,171,206 | 10/1979 | Sircar | 55/26 |
| 4,171,207 | 10/1979 | Sircar | 55/26 |
| 4,190,424 | 2/1980 | Armond et al. | 55/58 |
| 4,264,340 | 4/1981 | Sircar et al. | 55/25 |
| 4,329,158 | 5/1982 | Sircar | 55/26 |
| 4,386,945 | 6/1983 | Gardner | 55/26 |
| 4,448,592 | 5/1984 | Linde | 55/68 |
| 4,449,990 | 5/1984 | Tedford, Jr. | 55/26 |
| 4,477,264 | 10/1984 | Kratz et al. | 55/25 |
| 4,508,548 | 4/1985 | Manatt | 55/68 X |

FOREIGN PATENT DOCUMENTS 2631890 2/1977 Fed. Rep. of Germany .......... 55/58

Primary Examiner—Robert Spitzer
Attorney, Agent, or Firm—Sidney W. Millard

[57] ABSTRACT

Complementary pressure swing adsorption is a method of purifying and quantitatively recovering a plurality of components from a multicomponent gaseous mixture. A plurality of adsorption columns is used, each containing an adsorbent which is selective for one of the components to be recovered, but not the others. Blowdown and purge effluent from each column is used as high-pressure feed for a complementary column containing a different adsorbent. Nitrogen and oxygen may be separated from air, for use on tactical aircraft or in hospitals and various industries.

9 Claims, 1 Drawing Sheet

COMPLEMENTARY PRESSURE SWING ADSORPTION

BACKGROUND OF THE INVENTION

1. Field of the Invention

This invention relates generally to the separation of gaseous mixtures by selective adsorption, and more specifically to a pressure swing adsorption system designed to purify and quantitatively recover a plurality of components from a multicomponent gaseous mixture. Pressure swing adsorption is an art-recognized method which may be viewed as a four-step process such as the following. The adsorption bed is pressurized by entry of gas from the bottom of the bed while the top end of the bed is closed. This is referred to as the pressurization step. The next step is high pressure feed, wherein feed gas enters under pressure from the top of the column and effluent is allowed to escape from the bottom of the column. At the conclusion of this step the column is closed at both ends and the pressurized gas is then released by opening the top end of the column. This is referred to as the blowdown step. After the pressure has been reduced to a predetermined level by blowdown, the column is next purged of remaining product by feeding recycled product gas into the bottom end of the bed and allowing the gas remaining in the column to be forced out of the top end as effluent. This step would normally be terminated at the point where the purging gas reaches the top end of the column. The effluents from the blowdown and purge steps contain the component adsorbed by the column. This is generally referred to as the secondary product of the column. The primary product is the component or components which pass through the bed unadsorbed, i.e., the high pressure feed effluent.

Pressure swing adsorption has been used in numerous applications, including the separation of carbon dioxide and hydrogen from the effluent of a shift convertor in a hydrocarbon reforming plant, and the recovery of hydrogen and methane from the effluent gas of a hydrodesulfurization plant, as discussed below. As normally practiced, the process results in the non-quantitative recovery and purification of a single secondary product, and the marginal enrichment of a primary product. By contrast, complementary pressure swing adsorption, as presently disclosed and claimed, allows for the purification and quantitative recovery of two or more components from the feed gas. This is accomplished by feeding the exhaust from a column selective for one component into another column which is selective for another component.

2. Prior Art

Pressure swing adsorption systems designed for fractionation of gaseous multicomponent mixtures by selective adsorption are well known in the art. See e.g. U.S. Pat. Nos. 3,138,439, 3,142,547, 3,788,037, 3,221,476, 3,430,418, 3,720,042, 3,102,013, 3,149,934, 3,176,444, 3,237,379, 3,944,400, and 4,000,990.

U.S. Pat. No. 4,329,158 discusses the separation of oxygen from air using pressure swing adsorption. The process therein uses a first bed which adsorbs water and carbon dioxide and a second bed for the adsorption of nitrogen, which leaves an oxygen rich primary effluent product.

U.S. Pat. No. 4,264,340 discusses a similar pressure swing adsorption system wherein the secondary nitrogen component collected by the second bed is used to rinse both the first and second beds.

U.S. Pat. No. 4,171,206 discusses a pressure swing adsorption system for the separation of carbon dioxide and hydrogen from the effluent of a shift convertor in a hydrocarbon reforming plant. A first bed adsorbs carbon dioxide, a second bed adsorbs tertiary impurities consisting primarily of carbon monoxide and methane, and hydrogen is recovered as the primary component.

U.S. Pat. No. 4,171,207 discusses the use of pressure swing adsorption for the recovery of hydrogen and methane from the effluent gas of a hydrodesulfurization plant. A first bed adsorbs the C2-C6 hydrocarbon impurities and a second bed adsorbs the methane, leaving the enriched hydrogen component as the primary product.

It is significant that the prior art does not recognize nor teach a process wherein a plurality of columns adsorb each of the several components desired to be purified. Nor does the prior art teach a process wherein the several components to be purified are similar in nature such that a separation by selective adsorption would be difficult to accomplish. The prior art also does not teach a process wherein the product from a given column is used as feed for a complementary column. None of the processes taught by the prior art would be effective in the difficult separations to which the present invention is directed, e.g., complementary adsorption and purification of both nitrogen and oxygen from air. The most that the prior art processes could achieve in this regard would be a purification of one of these components and an enrichment of the other component in a mixed primary product. The prior art does not suggest the unexpectedly high degree of purification and recovery of each of these components achievable by the present process, nor the efficiency with which the present process achieves this result.

SUMMARY OF THE INVENTION

Complementary pressure swing adsorption is a method for achieving difficult separations and for purifying and recovering multiple components from a multicomponent gaseous mixture. A plurality of adsorption beds is used, each bed containing an adsorbent which is selective for one of the components to be recovered. Furthermore, the secondary product of one bed, that is, the blowdown and purge effluent, is used partly or wholly as the high pressure feed for another bed containing a different, or complementary adsorbent. This highly efficient system allows for the purification and quantitative recovery of two or more components from the multicomponent mixture, which result has not previously been achieved in the art.

Beyond the key elements listed above, the invention may encompass numerous embodiments. For instance, a single set of columns may be used, with one column being selective for each of the components to be recovered. In this case, each column may be purged and pressurized with recycled high pressure feed effluent from the same column, which effluent has been stored in a surge tank connected to the column via a flow conduit and, optionally, a compressor. For the separation of two components this would involve only a single pair of columns. In the preferred embodiment, two sets of columns would be used, with each set having one column selective for each of the components to be recovered. In this instance each column may be purged and pressurized with high pressure feed effluent from its duplicate column in the other set, containing the same adsorbent, the effluent again being fed to it via a flow conduit and a compressor. For the separation and recovery of two components, this embodiment would involve the use of two pairs of columns, as shown in FIG. 3.

In any of the embodiments, the columns may be purged and pressurized with high pressure feed effluent from the same or a duplicate column, i.e., a column containing the same adsorbent, as discussed above, or they may alternatively be purged or pressurized with purge effluent, blowdown effluent, or a mixture thereof, from another column containing a different adsorbent.

The high pressure feed for each column may consist exclusively of purge and blowdown effluent from a column containing a different adsorbent, or in the preferred embodiment, may be mixed with the raw multicomponent gaseous mixture for this purpose.

Complementary pressure swing adsorption may be used, for instance, in the purification and quantitative recovery of both nitrogen and oxygen from air. In this system, columns selective for nitrogen may contain the adsorbent zeolite 5A, and columns selective for oxygen may contain either the adsorbent zeolite 4A or the adsorbent carbonaceous sieve 5A. There is particular need for such a system on tactical aircraft, where oxygen is necessary for life support and nitrogen is necessary to blanket depleted fuel tanks. Efficiency under these circumstances is highly important, insofar as it is necessary to conserve engine bleed air for other onboard systems. Such a system may also find utility in hospitals, chemical plants and refineries, as well as in the metallurgical and semiconductor industries.

DETAILED DESCRIPTION

Figure 1:
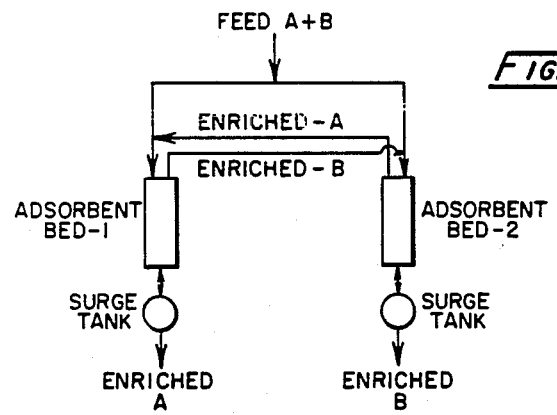
FIG. 1 shows a two-column system for purifying and recovering two components from the multicomponent gaseous mixture, wherein the high pressure feed effluent from each column is stored in a surge tank and recycled therefrom into the same column for pressurization and purge. This may be accomplished via separate influent and effluent conduits and valves, or via a single conduit and a single two-way valve which may be regarded as being both an influent and an effluent valve. The blowdown and purge effluents from each column, i.e., enriched-A and enriched-B, are channeled into the high pressure feed line for the complementary column.

The complementary pressure swing adsorption apparatus comprises a source of raw multicomponent gaseous mixture which is connected via flow conduits, compressors and influent valves to the top end of each of a set of adsorption columns. These flow conduits are the high pressure feed lines. Flow conduits also lead into influent valves in the bottom end of each bed, for purge and pressurization purposes. In a system comprising a single set of adsorbent columns with one column being selective for each of the components to be recovered, these conduits lead from surge tanks which collect the high pressure feed effluent of that column via a flow conduit leading from an effluent valve in the bottom of the column. Separate influent and effluent valves and conduits may connect the surge tank with the column, or a single conduit may be used, which connects to the column via a two-way valve. In this instance, the two-way valve is regarded as being both an influent and an effluent valve. In a system with two or more sets of adsorption columns, each of these conduits connects with an effluent valve at the bottom end of an identical column, containing the same adsorbent, and carries a portion of the high pressure feed effluent from the latter column. This is the preferred embodiment. Alternatively, these conduits may lead from the top end of a complementary column containing a different adsorbent, in which case they would carry the purge and blowdown effluents from the latter column, to be used as purging and pressurizing agents in this instance. In all cases, these conduits may be equipped with compressors to increase pressure when necessary, and they also have relief valves leading into surge tanks to reduce excess pressure.

Additionally, and in all embodiments, each column has a flow conduit leading out of an effluent valve in the top end of the column, which flow conduit connects via a valve into the high pressure feed line for a complementary column containing a different adsorbent. These conduits permit the blowdown and purge effluent from the first column to be used as the high-pressure feed for the second, complementary column. The valves connecting these conduits to the high-pressure feed lines operate so that the effluent may be mixed with raw feed for this purpose, or so that it may be used as the sole source of high pressure feed. See FIG. 3. These conduits are also equipped with compressors to increase pressure and valves leading to surge tanks to relieve excess pressure. In the preferred embodiment two sets of columns are used, i.e., two pairs of columns where two components are being recovered.

Each column hence has a top end with an influent valve and an effluent valve, and a bottom end with an influent valve and an effluent valve. Where a single set of columns is used and a portion of the high-pressure feed effluent of each column is recycled into the same column as purge and pressurization influent, the influent valve and effluent valve may be a single two-way valve, as discussed above.

The ratio of pressures used for each step in the process are more critical than are the absolute pressures. Pressurization begins at low pressure and progresses to high pressure. High-pressure feed is maintained at high pressure. A compressor maintains this pressure in the high-pressure feed lines throughout the cycle. Blowdown begins at high pressure and proceeds to low pressure. Purge is maintained at low pressure. In this description, low pressure may be either atmospheric pressure or subatmospheric pressure, and high pressure is superatmospheric pressure.

Figure 2:
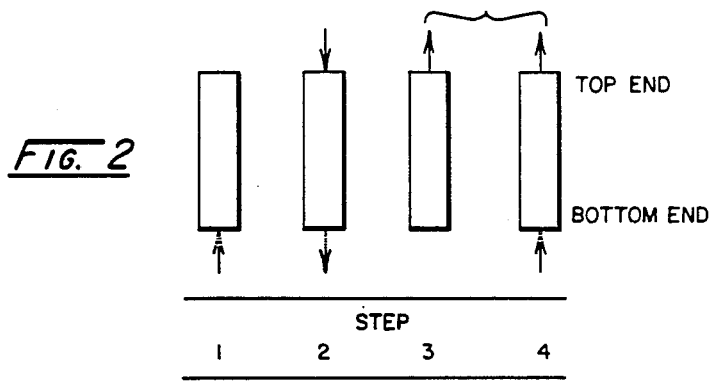
FIG. 2 shows the four steps in a basic pressure swing adsorption cycle for a single column. Step 1 is pressurization, step 2 is high-pressure feed, step 3 is blowdown, and step 4 is purge.
Figure 3:
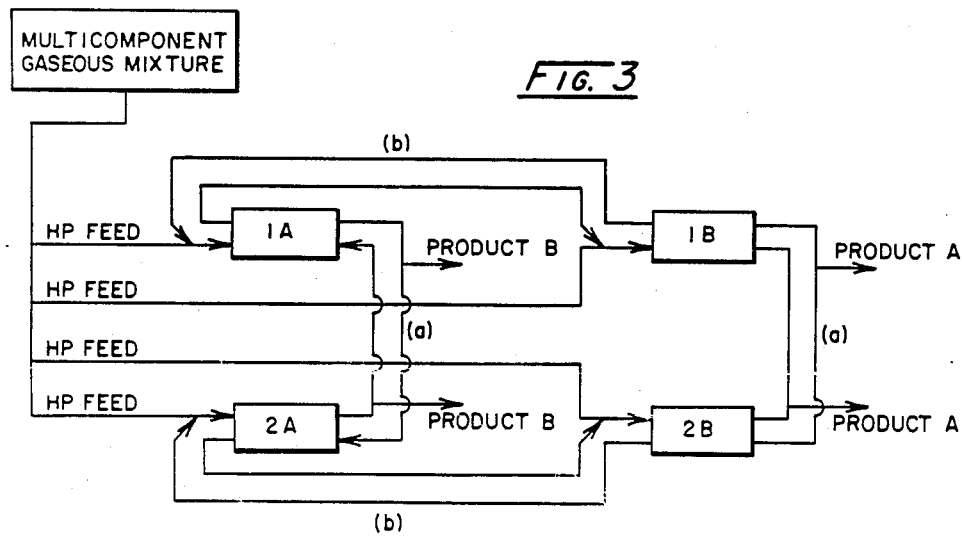
FIG. 3 is representative of the preferred embodiment, and shows a four column system for recovering two components. Columns 1A and 2A contain adsorbent A selective for component A. Columns 1B and 2B contain adsorbent B selective for component B. Pressurization and purge conduits, carrying high pressure feed effluent from each column to its duplicate column containing the same adsorbent, are marked with the letter (a). High pressure feed conduits, carrying blowdown and purge effluent from each column to the high pressure feed line have a complementary column containing a different adsorbent, are marked with the letter (b). It is noted that this effluent could alternatively be carried to the feed line of the other complementary column where appropriate. Components A and B are withdrawn as products from the conduits marked (a), as shown. Compressors for increasing pressure and relief valves to surge tanks for decreasing pressure are not shown.

In carrying out the process, the four basic steps of pressure swing adsorption, as discussed above and in FIG. 2, are followed in a cyclic manner. In a time sequence, each column is pressurized by the appropriate flow conduit, after which high pressure feed, blowdown and purge follow. The cycles for each column are integrated so that effluents from one column may be used as influents for another in an efficient manner. The cycle is carried out for a period of time appropriate to maximize purity and recovery at which point the various products are recovered via valves in the flow conduits carrying the high pressure feed effluent from each column, as shown in FIG. 3.

EXAMPLE

On tactical aircraft and in other potential applications as discussed above, the preferred four column system of FIG. 3 may be applied to the purification and quantitative recovery of two components, nitrogen and oxygen from air. For this application, columns 1A and 2A may be regarded as being those columns selective for nitrogen, and columns 1B and 2B may be regarded as those columns selective for oxygen. The adsorbent in columns 1A and 2A is hence zeolite 5A, and the adsorbent in columns 1B and 2B is carbonaceous sieve 5A.

The process may be started simply by feeding air (multicomponent gaseous mixture) into each column via the high pressure feed conduits, for pressurization. In the preferred mode, however, the columns selective for nitrogen are primed with oxygen and the columns selective for oxygen are primed with nitrogen. The priming gases may be introduced either via the pressurization and purge conduits or via the high pressure feed lines. In any case, this initial step represents the first pressurization of the columns. Air (multicomponent gaseous mixture) is next introduced into the columns for the high pressure feed step. This step proceeds until the front end of the high pressure feed gas has reached the bottom of the column. The effluent from this step is collected by the flow conduits (a) and carried to the duplicate column containing the same adsorbent, for use as pressurization and purge influent, as shown in FIG. 3. Each column is next blown down and purged, the effluent from these steps being collected by the flow conduits B and carried to the high pressure feed line of a complementary column containing a different adsorbent. (It is noted that the effluent could alternatively be carried to the high pressure feed line of the other complementary column.)

The process is now ready for the second cycle. Each column is pressurized with recycled high pressure feed effluent collected from the duplicate column during the previous cycle. The high pressure feed step then commences, using air (multicomponent gaseous mixture) mixed with the blowdown and purge effluent. Cycles continue until a maximal state of recovery and purity for the nitrogen and oxygen components has been reached, and the nitrogen and oxygen components are then collected via valves in the flow conduits carrying the high pressure feed effluent from each column, as shown in FIG. 3.

It will be appreciated the numerous changes and modifications may be made in the above described embodiments of the invention without departing from the scope thereof. Accordingly the foregoing description is to be construed in an illustrative and not in a limitative sense, the scope of the invention being defined solely by the claims which follow.

I claim:

1. A method for purifying and quantitatively recovering a plurality of components from a multicomponent gaseous mixture using complementary pressure swing adsorption technology, wherein two adsorption columns are used, each column being selectively adsorptive for a different one of the components to be recovered, each column further having a top end with an influent valve and an effluent valve and a bottom end with an influent valve and an effluent valve, which comprises the sequential steps of:
    (a) opening the influent valve at the bottom end of one said column, while the other valves remain closed,
    (b) pressurizing said one column by injecting gaseous influent through the open valve,
    (c) closing the previously open valve and opening the influent valve at the top end of said one column and the effluent valve at the bottom end of said one column,
    (d) high-pressure feeding said one column, through the open influent valve, with blowdown and purge effluent from the other said column, while withdrawing effluent from said one column through said open effluent valve in the bottom,
    (e) closing the previously open valves in said one column and opening the effluent valve at the top end of said one column,
    (f) blowing down said one column by allowing effluent to escape through the open valve,
    (g) opening the influent valve at the top end of said other column and delivering said effluent from the one column to the other column through the open influent valve,
    (h) opening the effluent valve in the bottom of the other column and withdrawing effluent,
    (i) closing the open influent and effluent valves of the other column and opening the effluent valve at the top of the other column,
    (j) blowing down said other column by allowing effluent to escape through the open valve and delivering the effluent to the influent valve at the top of the one column and
    (k) opening the influent valve at the top of the one column and opening the effluent valve at the bottom of the one column to withdraw effluent.

2. A method as in claim 1, wherein the blowdown and purge effluent in steps (g) and (k) are mixed with said multicomponent gaseous mixture prior to being high-pressure fed into each column.

3. A method as in claim 1, wherein each column is pressurized and purged with high pressure feed effluent from the same column.

4. A method as in claim 1, wherein the multicomponent gaseous mixture is air, and wherein the components to be purified and quantitatively recovered are nitrogen and oxygen.

5. A method as in claim 4, wherein the adsorbent in the column selective for nitrogen is zeolite 5A, and wherein the adsorbent in the column selective for oxygen is zeolite 4A or carbonaceous sieve 5A.

6. An apparatus for purifying and quantitatively recovering a plurality of components from a multicomponent gaseous mixture using complementary pressure swing adsorption technology, comprising:

(a) a plurality of adsorption columns, each column having a top end and a bottom end, and each column containing an adsorbent which is selective for one of the components to be recovered, (b) means for connecting the top end of each column to the top end of another column, which another column contains a different adsorbent from the column to which its top is connected, so that blowdown and purge effluent from each column can be supplied as high-pressure feed influent to said another column, and (c) means for connecting the bottom end of each column with the bottom end of another column, which another column contains the same adsorbent as the column to which its bottom is connected, so that high pressure feed effluent from each column can be supplied as the pressurizing and purging influent to said other column.

7. An apparatus as in claim 6, comprising four and only four adsorption columns.

8. An apparatus as in claim 7, wherein two columns contain an adsorbent selective for nitrogen and the other two columns contain an adsorbent selective for oxygen.

9. An apparatus as in claim 8, wherein the adsorbent selective for nitrogen is zeolite 5A and the adsorbent selective for oxygen is zeolite 4A or carbonaceous sieve 5A.

* * * * *